US008777101B2

(12) United States Patent
Weitzman

(10) Patent No.: US 8,777,101 B2
(45) Date of Patent: Jul. 15, 2014

(54) MONITORING OF STORED-VALUE-INSTRUMENT USAGE

(75) Inventor: Felix Weitzman, Conifer, CO (US)

(73) Assignee: First Data Corporation, Greenwood Village, CO (US)

( * ) Notice: Subject to any disclaimer, the term of this patent is extended or adjusted under 35 U.S.C. 154(b) by 1018 days.

(21) Appl. No.: 11/686,697

(22) Filed: Mar. 15, 2007

(65) Prior Publication Data

US 2008/0223922 A1 Sep. 18, 2008

(51) Int. Cl.
G06K 5/00 (2006.01)
G06F 17/00 (2006.01)
G06K 19/00 (2006.01)

(52) U.S. Cl.
USPC ............................ 235/380; 235/375; 235/487

(58) Field of Classification Search
CPC ....... G06Q 20/20; G06Q 40/00; G06Q 20/10; G06Q 20/204; G06Q 20/341; G06Q 20/40; G06Q 20/28; G06Q 20/342; G06Q 30/06; G06Q 40/12; G06Q 20/105; G06Q 20/32; G06Q 30/0238; G06Q 40/02; G06Q 20/389; G06Q 20/4014; G06Q 30/0229; G06Q 30/0233; G06Q 20/387; G06Q 30/00; G06Q 30/0603; G06Q 20/102; G06Q 20/227; G06Q 20/343; G06Q 30/0225; G06Q 20/206
USPC .......... 235/380, 379, 487, 493, 375; 382/137; 283/58, 77; 705/39, 30, 35
See application file for complete search history.

(56) References Cited

U.S. PATENT DOCUMENTS

| | | | | |
|---|---|---|---|---|
| 4,984,270 A * | 1/1991 | LaBounty | ....................... | 705/72 |
| 5,044,668 A * | 9/1991 | Wright | ............................. | 283/58 |
| 5,334,823 A * | 8/1994 | Noblett et al. | ................ | 235/380 |
| 6,000,608 A * | 12/1999 | Dorf | ............................. | 235/380 |
| 6,003,763 A * | 12/1999 | Gallagher et al. | ............ | 235/379 |
| 6,224,109 B1 * | 5/2001 | Yang | ................................ | 283/77 |
| 6,402,029 B1 * | 6/2002 | Gangi | ............................ | 235/380 |
| 6,920,437 B2 | 7/2005 | Messina | | |
| 2003/0111526 A1 * | 6/2003 | Smith | ........................... | 235/379 |
| 2004/0205138 A1 * | 10/2004 | Friedman et al. | ............. | 709/206 |
| 2004/0215963 A1 * | 10/2004 | Kaplan | ......................... | 713/172 |
| 2004/0234117 A1 * | 11/2004 | Tibor | ............................ | 382/137 |
| 2005/0125317 A1 * | 6/2005 | Winkelman et al. | ............ | 705/30 |
| 2005/0154670 A1 * | 7/2005 | Heitz et al. | ...................... | 705/39 |
| 2005/0199705 A1 * | 9/2005 | Beck et al. | ..................... | 235/380 |
| 2006/0026073 A1 | 2/2006 | Kenny, Jr. et al. | | |
| 2007/0051797 A1 | 3/2007 | Randolph-Wall et al. | | |

FOREIGN PATENT DOCUMENTS

WO 2008/112995 A1 9/2008

OTHER PUBLICATIONS

IBM Technical Disclosure Bulletin, "Iterative PIN Generation", Jun. 1986, vol. 29, p. 14-16.*
International Search Report and Written Opinion of PCT/US2008/057043 mailed Jul. 17, 2008, 5 pages.

* cited by examiner

Primary Examiner — Thien T Mai
(74) Attorney, Agent, or Firm — Kilpatrick Townsend & Stockton LLP

(57) ABSTRACT

Methods and systems are disclosed of executing a financial transaction that enable enhanced usage monitoring. Funds are received from a buyer for purchase of a single-load stored-value instrument. The single-load stored-value instrument is associated with a predefined value amount. Buyer identification information that identifies the buyer is received. The buyer identification information is stored in association with the stored-value instrument. The stored-value instrument is validated for use in making purchase by drawing from value associated with the stored-value instrument.

18 Claims, 3 Drawing Sheets

MONITORING OF STORED-VALUE-INSTRUMENT USAGE

BACKGROUND OF THE INVENTION

This application relates generally to financial transactions. More specifically, this application relates to monitoring of the usage of stored-value instruments.

In a modern commercial environment, there is an array of different financial products that consumers have available to them in executing financial transactions. Some of the more prevalent forms of transactions may be characterized as credit transactions, debit transactions, and stored-value transactions. Each of these transactions differs in the manner in which access to funds is provided to the consumer. For example, credit transactions are supported by funds provided by a creditor to a customer. The principal example of such credit transactions are credit-card transactions in which the creditor issues a card to the customer that the customer may use as a presentation instrument to identify a credit account. When the transaction is executed, funds are drawn against the credit account, which usually has a pre-established credit limit, to support the transaction.

Debit transactions may also make use of a presentation instrument. The source of funds for a debit transaction is specifically identified with an account that holds the funds, and this account is usually a demand-deposit account maintained at a financial institution. As such, the funding of the account various over time as deposits and withdrawals are made from the account in response to receipt of wages, paying bills, etc. Debit transactions are typically completed within a short time, i.e. funds are transferred from the account to the control of a merchant or other party within a few minutes or less. In this respect, they tend to differ from check transactions, which take longer because of the time needed to process the checks. But the principles upon which the transactions are executed are otherwise generally similar.

A traditional stored-value transaction is one that uses funds that have been specifically set aside and associated with a presentation instrument so that they may be used to support a transaction. In most cases, such stored-value instruments are anonymous in that the funds are associated only with the instrument and not with any particular person. This has had the advantage that such instruments may be easily transferred and they find wide utility as gift cards. This gift aspect is frequently reinforced by imposing restrictions on the merchant with whom transactions may be executed with the set-aside funds. Implementations with such restrictions are sometimes referred to in the art as "closed-loop" implementations. They are distinct from "open-loop" implementations in which the stored-value instruments are more widely accepted at a variety of different merchants. In a typical open-loop implementation, the stored-value instrument is branded with a bank association logo, such as Visa®, MasterCard®, or Discover®. The instruments can then be used essentially whenever those brands are accepted.

The anonymity of traditional stored-value transactions has created certain difficulties in actual implementation. First, a major concern with all types of financial transactions is the potential for fraud to be committed. Attempting to limit the techniques available for engaging in fraudulent transactions is a significant preoccupation with those who design and implement financial-transaction schemes. Second, the lack of information tying use of the stored-value instrument to any individual makes it difficult to extract meaningful sales data since conventional demographic techniques cannot be applied. Third, it is sometimes desirable to change the character of the stored-value program accessed by the stored-value instrument. For example, products in which a gift card has the potential to be later upgraded to a reloadable card are popular. While a conventional stored-value system permits the pool of available funds only to be depleted as the instrument is used, a system that uses a reloadable card functions in manner more similar to debit transactions. That is, the pool of available funds may increase as deposits are made to "reload" the stored-value account. A reloadable stored-value system nonetheless still differs from a full debit system because restrictions may still remain on how the funds may be accessed. Cash withdrawals are typically not available, for instance, with the instrument still being useful only for purchases of goods or services at merchants. Such restrictions may still be imposed with reloadable stored-value systems in both closed- and open-loop implementations.

There is accordingly a general need in the art for methods and systems that provide for enhanced monitoring of the usage of stored-value instruments.

BRIEF SUMMARY OF THE INVENTION

Embodiments of the invention provide methods and systems of executing a financial transaction that enable such enhanced usage monitoring. Funds are received from a buyer for purchase of a single-load stored-value instrument. The single-load stored-value instrument is associated with a predefined value amount. Buyer identification information that identifies the buyer is received. The buyer identification information is stored in association with the stored-value instrument. The stored-value instrument is validated for use in making purchase by drawing from value associated with the stored-value instrument.

In some embodiments funds may be received from the buyer by receiving account information from a financial transaction instrument presented by the buyer for the purchase. Funds are received from a financial account identified by the account information and the buyer identification information is received as identification information received from the financial transaction instrument. In some instances, the account information and buyer identification information may be received by reading a magnetic stripe comprised by the financial transaction instrument. In other embodiments, the buyer identification information is received is identification information received from a nonfinancial instrument. This may also comprise reading a magnetic stripe comprised by the nonfinancial instrument in some embodiments. An example of a nonfinancial instrument that may be used is a driver's license.

Different embodiments of the invention also provide different ways of storing the buyer identification information in association with the stored-value instrument. For instance, in one embodiment, a representation of the buyer identification information is stored on the stored-value instrument. In another embodiment, a representation of the buyer identification information is stored on a data store with an identifier of the stored-value instrument.

Embodiments of the invention also enable subsequent transactions to be executed using the stored-value instrument and for those transactions to be included in various types of analyses. For example, a transaction request may be received identifying the stored value instrument. The transaction request includes a transaction amount. A determination is made that the transaction amount is less than an outstanding value amount associated with the stored-value instrument. An approval of the transaction request is transmitted. Information derived from the transaction request is stored in association with the stored-value instrument and the buyer identification information. The stored information derived from the transaction request may then be analyzed in combination with the buyer identification information as part of a fraud-detection analysis. Alternatively, the stored information derived from the transaction request may be analyzed in combination with the buyer identification information as part of a demographic analysis of usage of stored value instruments.

In still other embodiment, a functionality of the stored-value instrument may be upgraded to permit reloadability. The value associated with the stored-value instrument may then be increased.

These various methods of the invention may be implemented with a system that comprises a stored-value processor and a plurality of point-of-sale devices. The stored-value processor is interfaced with a financial network and a storage device, and each of the point-of-sale devices is interfaced with the financial network. The point-of-sale devices and stored-value processor include instructions to implement the methods described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
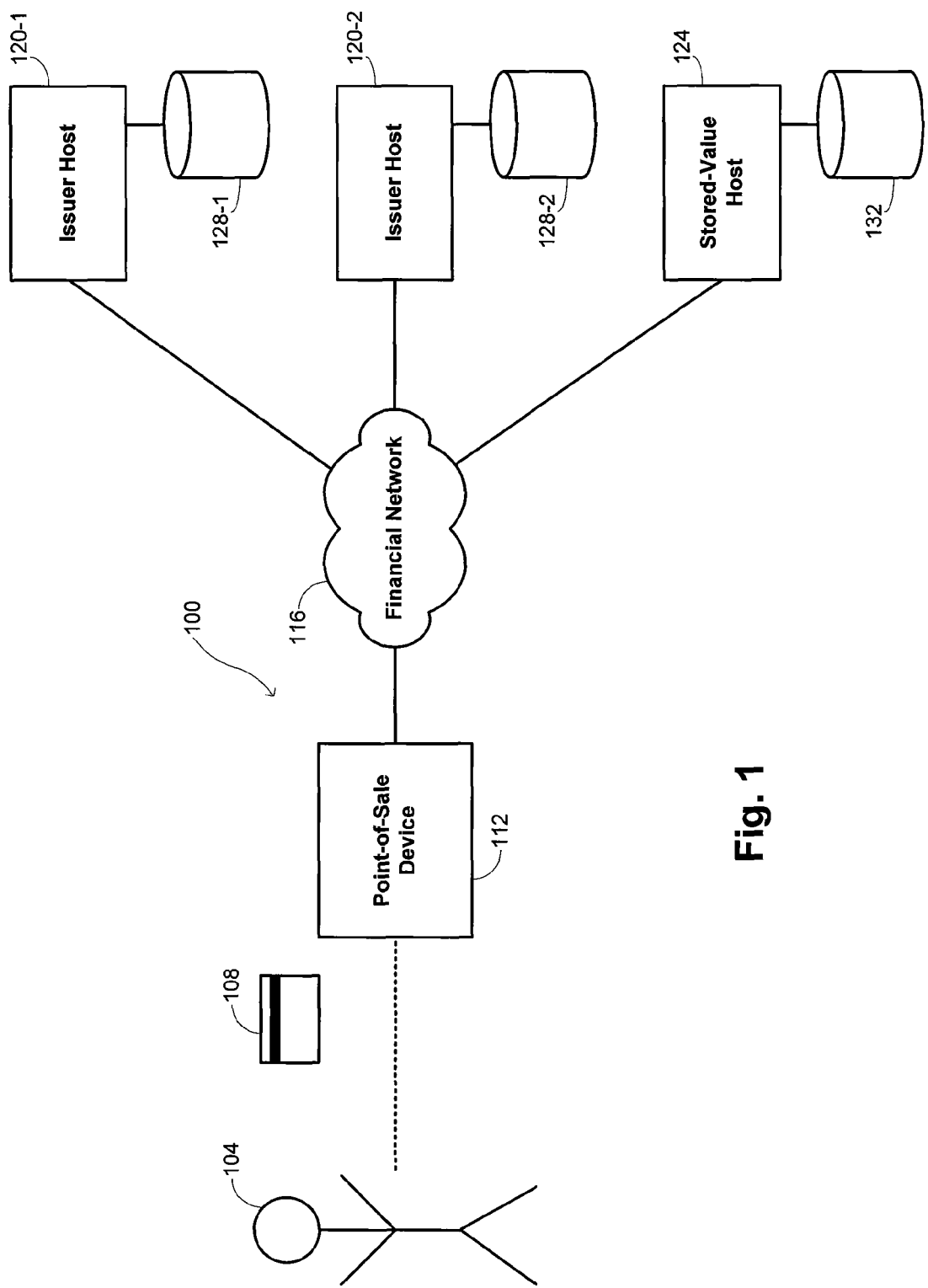
FIG. 1 is a schematic illustration of a financial architecture within which embodiments of the invention may be implemented.

Embodiments of the invention provide a number of different implementations of stored-value programs that have as a common factor their improved ability to monitor usage of the stored-value instruments. In many instances, such stored-value instruments may take the form of a wallet-sized card that resembles a credit or debit card. Such stored-value cards typically include printing that identifies the type of card—whether it is an open-loop card or closed-loop card, which merchants will accept the card if it is a closed-loop card, the initial amount of the stored value when the card is single-load, and so on. In addition, they may sometimes include some kind of data-storage mechanism, a common example of which is a magnetic stripe that is affixed to the card and that can store information using magnetic states.

The ability to monitor usage of the instruments provides a number of benefits. For example, the information that is collected as the instruments are used permits fraud analyses to be executed. Such analyses generally make use of pattern-recognition methodologies that permit the identification of usage patterns known to be indicative of certain fraud schemes. In many instances, these pattern-recognition methodologies are adaptive in that the ability to recognize patterns may change as additional information is made available.

For example, one suitable pattern-recognition methodology makes use of neural networks. A neural network is typically structured as a series of layers, usually at least an input layer, an output layer, and one intermediate layer. The input layer corresponds to inputs, i.e. may correspond to such data as specific types of transactions that are executed using the stored-value instruments. The output layer corresponds to outputs, i.e. may correspond to determinations such as that there is or is not fraud occurring. The input layer and output layer are connected within the neural network through a series of connections between them and the intermediate layer. These connections thus provide a specific mapping of inputs to an output determination, allowing the system to evaluate a set of transaction-information inputs to reach an output conclusion of whether fraud is occurring.

Adaptability of the system is achieved by the ability to alter the interconnections between the input or output layer with the intermediate layer. In a case, for instance, where the system predicts that a certain set of inputs indicates the presence of fraud but a later investigation confirms that the transactions were not fraudulent, the connections may be altered to provide the correct result. These altered connections may then be invoked when a new set of inputs is realized with a new set of transactions. The progressive reconfiguring of the neural network in this way thus consistently improves its reliability in performing analyses of transactions.

Other types of systems that can be used in mapping transaction information that is collected in accordance with embodiments of the invention to risk evaluations that fraud is occurring include expert systems, systems that implement genetic algorithms, systems that implement simulated annealing, and other artificial-intelligence systems that have an adaptive capability.

The collection of monitoring information also permits certain sales-data analyses to be performed. Generally such analyses do not make use of adaptive evaluation techniques, but instead apply statistical methods to enable the extraction of demographic conclusions to be extracted from the monitoring information. Such demographic conclusions can be useful in identifying specific market segments where promotional programs are succeeding or failing, for identifying demand patterns for the stored-value products, and then like. This information finds utility in a number business contexts, permitting the issuer of the stored-value products to alter their distribution, their default stored-value amounts, advertising, and a host of other business-related issues of relevance to the instruments in response to the results of the statistical analyses.

According to embodiments of the invention, then, buyer information is collected at a point of sale when a stored-value instrument is purchased. This information is then correlated with transaction information when that instrument is subsequently used. It may be the case that the individual using the instrument is not the same as the person who purchased it, but the information relating usage information back to the buyer still has useful demographic and fraud-analytical value.

FIG. 1 provides a schematic illustration of an architecture 100 within which embodiments of the invention may thus be implemented. In considering this architecture 100, it is worth noting that it shows only a small subset of a much larger financial architecture that may exist to enable functionality associated with a variety of other types of financial products. While elements in the drawing are shown with specific interconnectivity, other elements of this larger financial architecture may also have communications links with elements of the drawing, corresponding to circumstances in which elements of the drawing may have additional utility in supporting other types of financial transactions.

The architecture 100 of FIG. 1 is organized generally around a financial network 116 that coordinates communications between other elements of the architecture 100. Because of the sensitivity of the nature of the financial information that is communicated through it, the financial network 116 typically comprises a private network that implements sophisticated encryption protocols with mechanisms to avoid interception of information being transmitted, but this is not a requirement of the invention. It is also noted that while the interconnections with the financial network 116 are shown as being direct, this is unlikely to be the case in actual implementations. More usually, interconnection of elements with the financial network 116 will be achieved through a number of intermediaries, the specific structure of the interconnections not being particular relevance to how the invention is implemented.

The financial network 116 includes interfaces to a number of issuer host systems 120 and 124. Of these, at least one may comprise a stored-value host 124 specifically configured to implement and support the various stored-value functionalities used in executing stored-value transactions. Each of the issuer hosts 120, including the stored-value host 124, may further be interfaced with some kind of data store 128 or 132 where data are stored that are of relevance in effecting the operations performed by the respective issuer hosts. For example, some of the data stored by the data store 132 interfaced with the stored-value host 124 may include the buyer information collected at the time of sale of different stored-value instruments as well as the transaction information collected when they are used.

The financial network 116 is also interfaced with different point-of-sale devices 112 that are physically deployed at various merchant locations. It is through interactions with these point-of-sale devices 112 that the usage of stored-value instruments may be monitored in accordance with embodiments of the invention. The drawing illustrates a customer 104 who might interact with a particular one of the point-of-sale devices 112, together with a stored-value instrument 108 in the form of a magnetic-stripe card.

Figure 2:
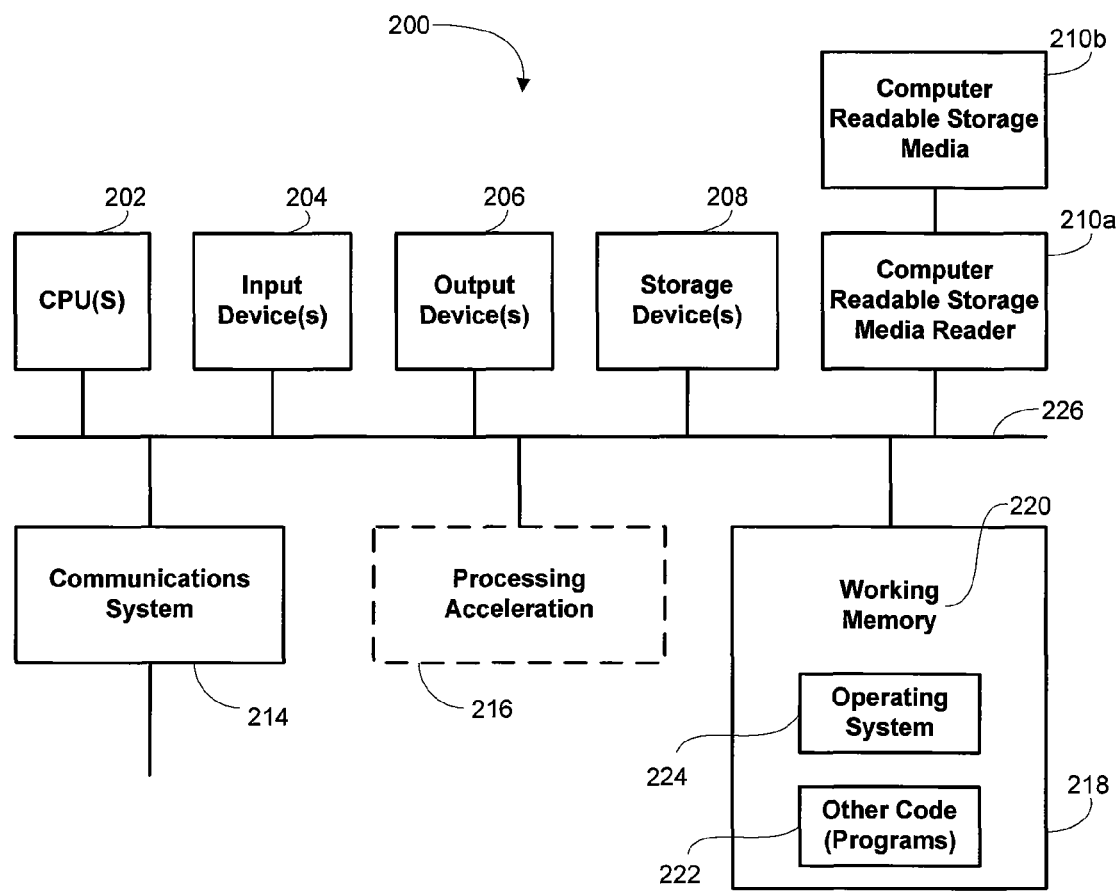
FIG. 2 is a schematic illustration of a computational unit that may be included as parts of elements of the financial architecture of FIG. 1.

FIG. 2 provides a schematic illustration of a physical structure that may be used to implement different computational systems that may form part of the architecture 100 of FIG. 1. For example, the computational systems 200 shown in FIG. 2 might correspond to a structure used for any of the issuer hosts 120, including for the stored-value host 124 in different embodiments. FIG. 2 broadly illustrates how individual system elements may be implemented in a separated or more integrated manner. The computational system 200 is shown comprised of hardware elements that are electrically coupled via bus 226, including a processor 202, an input device 204, an output device 206, one or more storage devices 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged within the architecture 100 to implement embodiments described herein.

The computational system 200 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3:
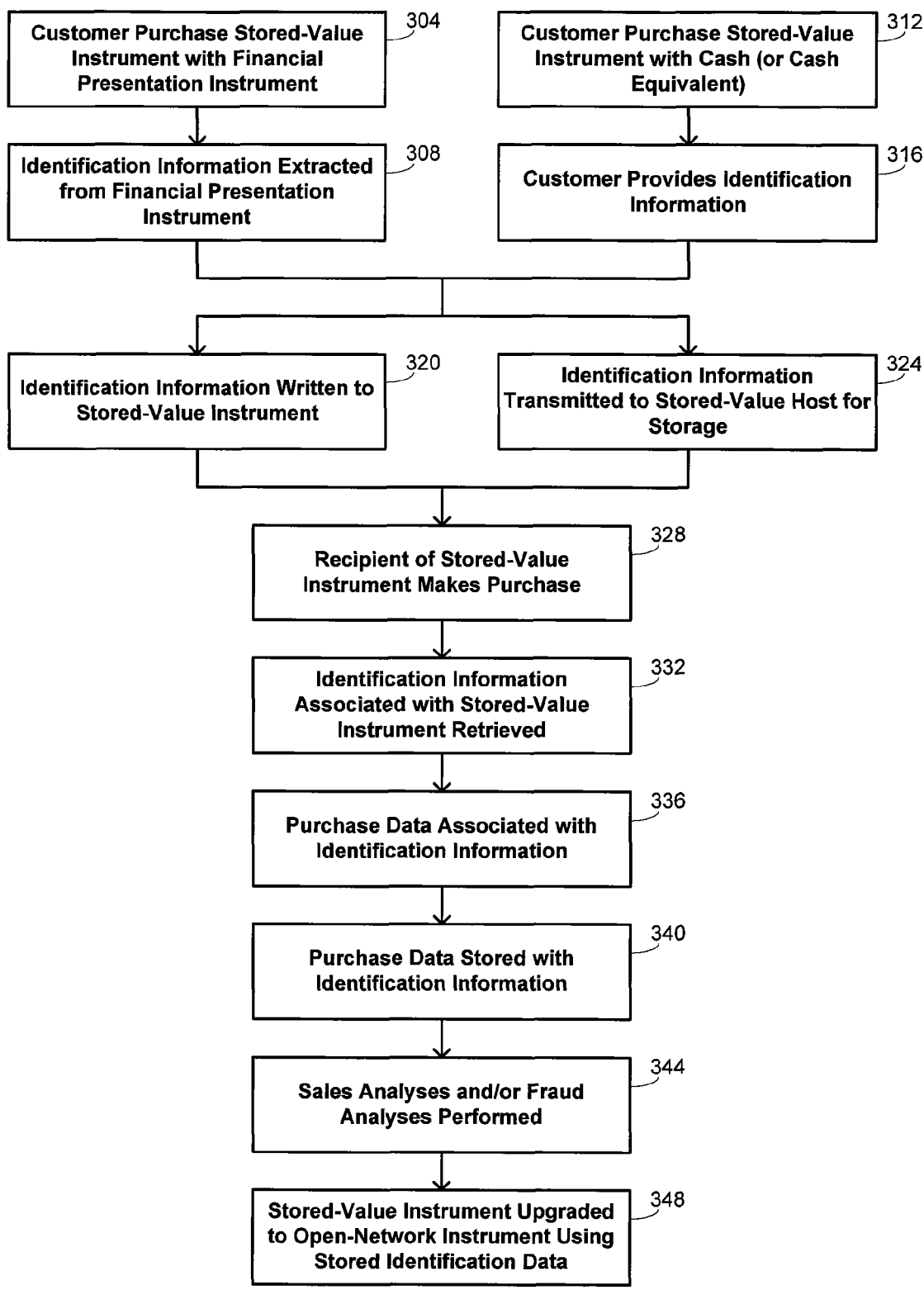
FIG. 3 is a flow diagram summarizing methods of implementing stored-value programs that permit enhanced monitoring of the usage of stored-value instruments.

There are a variety of different ways that the information of interest may be collected and stored in different embodiments of the invention. Some of these different ways are indicated in FIG. 3, which more generally provides a flow diagram that summarizes methods of the invention for collecting and monitoring information related to the usage of stored-value instruments. While the drawing shows a number of specific steps that may be performed in illustrative embodiments and shows a particular ordering of the steps, these are not intended to be limiting. In alternative embodiments, some of the steps may be omitted, additional steps not specifically shown may additionally be performed, and/or the ordering of the steps may be altered.

One technique for collecting buyer information for the stored-value instrument is indicated at blocks 304 and 308. When a customer purchases a stored-value instrument using a financial presentation instrument as indicated at block 304, the financial presentation instrument itself provides a convenient source of buyer information. Such financial presentation instruments might comprise such things as credit cards, debit cards, or the like, so that the purchase of a stored-value instrument in this way may correspond to a credit-card purchase of a gift card by a consumer. These presentation instruments typically have customer information encoded on them in some manner, such as when credit cards comprise a magnetic stripe that has data encoded on magnetic tracks. The identification information can accordingly be extracted from the financial presentation instrument at block 308 by reading such magnetic tracks using a magnetic-stripe reader comprised by the point-of-sale device 112.

In instances where the customer makes a purchase of a stored-value instrument using a mechanism that does not provide readily accessible identification information in this way, alternative techniques may be used to acquire the identification information. This is indicated, for example, at block 312 for an embodiment in which the purchase of the stored-value instrument is made using cash or a cash equivalent. The customer 104 is generally prompted to provide identification information at block 316 and a number of different mechanisms are available for doing so in different embodiments. For example, in some instances, the customer 104 may provide a driver's license or other form of identification. Many driver's licenses now included a magnetic stripe that includes identification information encoded on magnetic tracks in much the same way as such information is encoded on financial presentation instruments. Extraction of the identification information may then be performed by reading it from the magnetic stripe in the same manner as at block 308. If the identification instrument does not include a magnetic stripe, other techniques may be used to extract the identification information, including using optical character recognition to read the information directly from the instrument or by having a clerk act as an intermediary to key the information into the point-of-sale device 112.

In other instances, customer identification information may be obtained by reference to an external database. One example of how this may result is where the customer provides identification information in the form of a biometric measurement, i.e. through a measurement of his fingerprint, hand shape, iris structure, or the like. This biometric measurement may then be used to refer to a database that correlates identification information with biometrics.

In addition to there being at least two ways to acquire biometric information indicated by the different prongs at the top of FIG. 3, there are at least two ways to store the identification information that is collected. One approach, indicated at block 320, is to write the identification information directly to the stored-value instrument. This is an option whenever the stored-value instrument has storage capacity, and may involve writing the identification information to a magnetic stripe comprised by the stored-value instrument. Alternatively, the identification information may be stored remotely, such as when it is stored on the data store 132 coupled with the stored-value host 124, as indicated at block 324. When information is stored remotely in this way, it is usually stored with an indication of the stored-value instrument to which it pertains, such as by associating the customer identification information with a number assigned to the stored-value instrument.

The collection and storage of the customer identification information, no matter how it is accomplished, permits the subsequent association of transaction information with the customer who purchased the stored-value instrument. Accordingly, when the recipient of the stored-value instrument makes purchases using it at block 328, the identification information associated with the instrument may be retrieved at block 332. This retrieval might be done directly by reading it from the stored-value instrument itself if it is stored there, or might be done indirectly by obtaining a number from the stored-value instrument that is used to cross-reference a remote database that holds the identification information.

The transaction information is associated with the identification information at block 336, with the combination then being stored at block 340. Usually, this combination is stored on the data store 132 interfaced with the stored-value host 124, but may be stored in other locations in different embodiments. As the body of stored data increases, analyses may be performed as described above to evaluate sales data statistically or to identify patterns indicative of potential fraud at block 344.

An additional feature that may be simplified by having ready access to identification information is indicated at block 348 in the form of upgrading the characteristics of the stored-value instrument. There are instances where customers or recipients of stored-value cards grow to rely on the convenience of the instrument in executing transactions. In particular, the upgrade may act effectively to convert the stored-value instrument from use in a closed-loop configuration to use in an open-loop configuration, thereby increasing the capabilities of using the instrument in executing transactions.

Because of the nature of open-loop configurations, it is frequently desirable that identification information be associated with the instrument. In prior-art implementations that had no identity information associated with the instrument where purchased for closed-loop applications, an upgrade of the instrument would require that identification information be collected as part of the upgrade procedure. This additional step is avoided in embodiments of the invention by making use of the identification information collected at the time of purchase of even an instrument restricted to closed-loop implementations.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of executing a financial transaction, the method comprising:
   receiving, by a stored value host computer system from a point of sale device, an identifier of a single-load stored-value instrument being purchased;
   receiving funds from a financial account of a buyer for purchase of the single-load stored-value instrument, the single-load stored-value instrument being associated with a predefined value amount, wherein:
      the funds are received from the buyer after reading account information from a magnetic stripe of a financial transaction instrument used by the buyer to make the purchase of the single-load stored-value instrument; and
      the purchase constitutes the single-load of the single-load stored-value instrument and there is no reload possibility;
   receiving, by the stored value host computer system from the point of sale device, buyer identification information identifying the buyer captured from the magnetic stripe of the financial transaction instrument used by the buyer to make the purchase of the single-load stored-value instrument, wherein:
      the buyer identification information and the account information were captured from the magnetic stripe of the financial transaction instrument by the point-of-sale device during the purchase of the single-load stored-value instrument; and
   storing, by the stored value host computer system, the buyer identification information captured from the magnetic stripe of the financial transaction instrument used by the buyer to make the purchase of the single-load stored-value instrument in association with the received identifier of the single-load stored-value instrument received from the point of sale device in a database of the stored value host computer system such that the database is available for use in identifying potential fraud.

2. The method recited in claim 1 wherein storing the buyer identification information in association with the stored-value instrument comprises storing a representation of the buyer identification information on the stored value instrument.

3. The method recited in claim 1 wherein storing the buyer identification information in association with the stored-value instrument comprises storing a representation of the buyer identification information on a data store with an identifier of the stored-value instrument.

4. The method recited in claim 1 further comprising:
   receiving a transaction request identifying the stored-value instrument, the transaction request including a transaction amount;
   determining that the transaction amount is less than an outstanding value amount associated with the stored-value instrument;
   transmitting an approval of the transaction request: and storing information derived from the transaction request in association with the stored-value instrument and the buyer identification information.

5. The method recited in claim 4 further comprising analyzing, the stored information derived from the transaction request in combination with the buyer identification information as part of a fraud-detection analysis.

6. The method recited in claim 4 further comprising analyzing the stored information derived. from the transaction request in combination with the buyer identification information as part of a demographic analysis of usage of stored-value instruments.

7. The method recited in claim 1 wherein the stored-value instrument comprises a stored-value card.

8. A system for executing a financial transaction, the system comprising:
   a stored-value processor interfaced with a financial network and a storage device;
   an issuer processor interfaced with the financial network; and
   a point-of-sale device interfaced with the financial network, wherein:
      the point-of-sale device stores instructions, that when executed by a processor of the point-of-sale device cause the point-of-sale device to:
         receive an identifier of a single-load stored-value instrument being purchased;
         receive funds-payment information supporting a purchase by a buyer of the single-load stored-value instrument by reading an account number from a magnetic stripe of a financial transaction instrument of the buyer when making the purchase. the single-load stored-value instrument being associated with a predefined value amount, wherein
            the purchase constitutes the single-load of the single-load stored-value instrument and there is no reload possibility;
         read buyer identification information identifying the buyer by reading the buyer identification information from the magnetic stripe of the payment instrument of the buyer; and
         transmit the identifier of the single-load stored-value instrument and the buyer identification information read from the magnetic stripe of the payment instrument to the stored-value processor and the issuer processor, wherein
            the buyer identification information and the account number were captured from the magnetic stripe of the financial transaction instrument by the point-of-sale device during the purchase of the single-load stored-value instrument;
      the issuer processor includes instructions to receive the identifier of the single-load stored-value instrument, the account number, and the buyer identification information;
      the stored-value processor stores instructions that when executed by a processor of the stored-value processor cause the stored-value processor to:
         receive the identifier of the single-load stored-value instrument and the buyer identification information. and to validate the stored-value instrument for use in making purchases by drawing from value associated with the stored-value instrument; and
         store the buyer identification information read from the magnetic stripe of the payment instrument in association with the received identifier of the single-load stored-value instrument such that the buyer identification information is available for use in identifying potential fraud.

9. The system recited in claim 8 where the instructions to store the buyer identification information comprise instructions to store a representation of the buyer identification information on the stored-value instrument.

10. The system recited in claim 8 wherein the instructions to store the buyer identification information comprise instructions to store a representation of the buyer identification comprise instructions to store a representation of the buyer identification information on the storage device.

11. The system recited in claim 8 wherein the system further comprises:
   at least a second point-of-sale device that stores instructions, that when executed by a second processor of the second point-of-sale device, cause the second point-of-sale device to:
      receive a transaction request identifying the stored-value instrument, the transaction request including a transaction amount; and
   the stored-value processor further stores instructions, that when executed by the processor of the stored value processor causes the stored value processor to:
      determine that the transaction amount is less than an outstanding value amount associated with the stored-value instrument; and
      store information derived from the transaction request in association with the stored-value instrument and the buyer identification information.

12. The system recited in claim 11 wherein the stored-value processor further comprises instructions to analyze the stored information derived from the transaction request in combination with the buyer identification information as part of a fraud-detection analysis.

13. The system recited in claim 11 wherein the stored-value processor comprises instructions to analyze the stored information derived from the transaction request in combination with the buyer identification information as part of a demographic analysis of usage of stored-value instruments.

14. A method of executing a financial transaction, the method comprising:
   receiving, by a stored value host computer system from a point of sale device, an identifier of a single-load stored-value instrument being purchased;
   receiving funds from a buyer for purchase of the single-load stored-value instrument, the single-load stored-value instrument being associated with a predefined value amount, wherein the funds are received after reading account information from a financial transaction instrument presented by a buyer to make the purchase of the single-load stored-value instrument, wherein
      the purchase constitutes the single-load of the single-load stored-value instrument and there is no reload possibility;
   receiving, by the stored value host computer system from the point of sale device, buyer identification information identifying the buyer captured from the magnetic stripe of the financial transaction instrument used by the buyer to make the purchase of the single-load stored-value instrument, wherein
      the buyer identification information and the account information were captured from the magnetic stripe of the financial transaction instrument by the point-of-sale device during the purchase of the single-load stored-value instrument; and storing, by the stored value host computer system, the buyer identification information captured from the magnetic stripe of the financial transaction instrument used by the buyer to make the purchase of the single-load stored-value instrument in association with the received identifier of the single-load stored-value instrument in a database of the stored value host computer system such that the database is available for use in identifying potential fraud.

15. The method of executing the financial transaction of claim 1, wherein buyer identification information comprises an account number.

16. The method of executing the financial transaction of claim 1, wherein buyer identification information comprises the buyer's name.

17. The method of executing the financial transaction of claim 1, further comprising:
  performing a pattern-recognition based fraud analysis using the buyer identification information captured from the magnetic stripe of the financial transaction instrument used by the buyer to make the purchase of the single-load stored-value instrument. wherein
  the pattern-recognition based fraud analysis uses identification information captured from a plurality of magnetic stripes of a plurality of financial transaction instruments used by a plurality of buyers to make the purchase of single-load stored-value instruments.

18. The method of executing the financial transaction of claim 17, wherein the pattern-recognition based fraud analysis utilizes a neural network.

\* \* \* \* \*